United States Patent
Tsuda

(10) Patent No.: US 9,319,999 B2
(45) Date of Patent: Apr. 19, 2016

(54) COMMUNICATION CONTROL DEVICE, COMMUNICATION CONTROL METHOD, COMMUNICATION SYSTEM, AND TERMINAL DEVICE WHICH TAKES INTO ACCOUNT AT LEAST ONE PROXIMATE MULTI-MODE TERMINAL SERVICED BY A PLURALITY OF COMMUNICATION SERVICES

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 141 days.

(21) Appl. No.: 14/234,796

(22) PCT Filed: Jul. 9, 2012

(86) PCT No.: PCT/JP2012/067472
§ 371 (c)(1),
(2), (4) Date: Jan. 24, 2014

(87) PCT Pub. No.: WO2013/021764
PCT Pub. Date: Feb. 14, 2013

(65) Prior Publication Data
US 2014/0155118 A1   Jun. 5, 2014

(30) Foreign Application Priority Data

Aug. 11, 2011 (JP) .................................. 2011-175583

(51) Int. Cl.
*H04W 88/06* (2009.01)
*H04W 16/14* (2009.01)
(Continued)

(52) U.S. Cl.
CPC ............ *H04W 52/38* (2013.01); *H04W 52/143* (2013.01); *H04W 52/247* (2013.01); *H04W52/281* (2013.01); *H04W 52/386* (2013.01); *H04W 88/06* (2013.01); *H04W 8/183* (2013.01); *H04W 92/08* (2013.01)

(58) Field of Classification Search
CPC . H04W 88/06; H04W 52/143; H04W 52/281; H04W 52/38; H04W 92/08; H04W 16/14; H04W 52/247; H04W 52/386; H04W 8/183
See application file for complete search history.

(56) References Cited

U.S. PATENT DOCUMENTS

2010/0279737 A1   11/2010   Joppek et al.
2011/0028179 A1   2/2011    Sawai et al.

FOREIGN PATENT DOCUMENTS

JP   2004356815 A   12/2004
JP   2008-210301 A   9/2008
(Continued)

OTHER PUBLICATIONS

No Author Listed, 3$^{rd}$ Generation Partnership Project; Technical Specification Group Service and System Aspects; Requirements for seamless roaming and service continuity between mobile and WLAN networks (Release 8), 3GPP Draft; S1-070017, (Jan. 19, 2007), 24 pages.

*Primary Examiner* — Bobbak Safaipour
*Assistant Examiner* — Devan Sandiford
(74) *Attorney, Agent, or Firm* — Sony Corporation

(57) ABSTRACT

There is provided a communication control device including a power control unit configured to control a transmission power of a secondary communication service to be provided at least near an area where a first primary communication service is provided. The power control unit increases the transmission power of the secondary communication service upon performing a switching from subscriber identity module (SIM) information corresponding to the first primary communication service to SIM information corresponding to a second primary communication service in a terminal device using a communication service by using any SIM information switched between a plurality of SIM information.

20 Claims, 10 Drawing Sheets

(51) Int. Cl.
*H04W 52/38* (2009.01)
*H04W 52/14* (2009.01)
*H04W 52/28* (2009.01)
*H04W 52/24* (2009.01)
*H04W 92/08* (2009.01)
*H04W 8/18* (2009.01)

(56) References Cited

FOREIGN PATENT DOCUMENTS

| | | |
|---|---|---|
| JP | 2010-178225 A | 8/2010 |
| JP | 2010-187371 A | 8/2010 |
| JP | 2011-024068 A | 2/2011 |
| WO | WO 2011/007576 A1 | 1/2011 |

COMMUNICATION CONTROL DEVICE, COMMUNICATION CONTROL METHOD, COMMUNICATION SYSTEM, AND TERMINAL DEVICE WHICH TAKES INTO ACCOUNT AT LEAST ONE PROXIMATE MULTI-MODE TERMINAL SERVICED BY A PLURALITY OF COMMUNICATION SERVICES

TECHNICAL FIELD

The present disclosure relates to a communication control device, a communication control method, a communication system, and a terminal device.

BACKGROUND ART

Conventionally, third-generation cellular communication services are widely used. In the third-generation cellular communication services, it has become possible to download a large amount of data (e.g., video content, music content, etc.) to a terminal device at a higher speed, for example, by the introduction of HSDPA (High Speed Downlink Packet Access). With the increase of the amount of data to be downloaded, the expansion of wireless networks is in progress. For example, in HSPA+ (High Speed Packet Access Plus) that has been standardized by 3GPP (Third Generation Partnership Project), it is possible to realize a communication service having a downlink speed of up to 21 Mbps. In addition, in Mobile WiMAX standardized by IEEE (The Institute of Electrical and Electronics Engineers, Inc.), it is possible to realize a communication service having a downlink speed of up to 40 Mbps. Further, LTE (Long Term Evolution) communication services called 3.9G cellular communication services have also been put to practical use. Fourth-generation cellular communication services are also scheduled to launch around 2015.

In various wireless communication services described above, in order to identify each individual subscriber, a SIM (Subscriber Identity Module) card that contains SIM information is typically used (e.g., see Patent Literature 1 below). The SIM information contains, for example, an identification number called IMSI (International Mobile Subscriber Identity). By referring to the IMSI, it is possible to identify the country and carrier to which each individual subscriber belongs. In recent years in which the use of wireless communication services is diversified, it has also become common to use various wireless communication services while switching a plurality of SIM information in one terminal device. This is achieved by a terminal device called multi-SIM terminal.

CITATION LIST

Patent Literature

Patent Literature 1: JP 2008-210301A
Patent Literature 2: JP 2010-187371A

SUMMARY OF INVENTION

Technical Problem

However, frequency resources available for wireless communication services are becoming exhausted in many countries. Thus, it has been made an attempt to open a frequency band assigned to a primary communication service for a secondary communication service in an area where the frequency band is not used (e.g., see Patent Literature 2 above). Such exhaustion of frequency resources is an issue that is not to be ignored, and thus it is desirable to provide a mechanism capable of utilizing limited resources more efficiently.

A technology according to the present disclosure is intended to expand an opportunity to use a secondary communication service and utilize limited resources more efficiently in a case where the multi-SIM terminal described above is used.

Solution to Problem

According to the present disclosure, there is provided a communication control device including a power control unit configured to control a transmission power of a secondary communication service to be provided at least near an area where a first primary communication service is provided. The power control unit increases the transmission power of the secondary communication service upon performing a switching from subscriber identity module (SIM) information corresponding to the first primary communication service to SIM information corresponding to a second primary communication service in a terminal device using a communication service by using any SIM information switched between a plurality of SIM information.

According to the present disclosure, there is provided a communication control method performed by a communication control device configured to control a secondary communication service to be provided at least near an area where a first primary communication service is provided, the method including increasing a transmission power of the secondary communication service upon performing a switching from subscriber identity module (SIM) information corresponding to the first primary communication service to SIM information corresponding to a second primary communication service in a terminal device using a communication service by using any SIM information switched between a plurality of SIM information.

According to the present disclosure, there is provided a communication system including a terminal device configured to use a communication service by using any subscriber identity module (SIM) information switched between a plurality of SIM information corresponding to a plurality of primary communication services, and a communication control device configured to include a power control unit for controlling a transmission power of a secondary communication service to be provided at least near an area where a first primary communication service is provided. The power control unit increases the transmission power of the secondary communication service upon performing a switching from SIM information corresponding to the first primary communication service to SIM information corresponding to a second primary communication service in the terminal device.

According to the present disclosure, there is provided a terminal device including a communication unit configured to communicate by using any subscriber identity module (SIM) information switched between a plurality of SIM information corresponding to a plurality of primary communication services, and a control unit configured to, when SIM information used by the communication unit is switched from first SIM information corresponding to a first primary communication service to second SIM information corresponding to a second primary communication service, report the switching to a communication control device for controlling a transmission power of a secondary communication service to be provided at least near an area where the first primary communication service is provided.

According to the present disclosure, there is provided a communication control device for providing a first primary communication service to a terminal device that communicates by using any SIM (Subscriber Identity Module) information switched between a plurality of SIM information corresponding to a plurality of primary communication services, including an instruction unit configured to instruct the terminal device to switch from SIM information corresponding to the first primary communication service to SIM information corresponding to a second primary communication service depending on a communication quality of the first primary communication service for the terminal device, and a secondary control unit configured to cause a node to increase a transmission power of a secondary communication service in accordance with the instruction by the instruction unit, the node being configured to control the transmission power of the secondary communication service provided at least near an area where the first primary communication service is provided.

Advantageous Effects of Invention

In accordance with the technology according to the present disclosure, in a case where the multi-SIM terminal is used, it is possible to expand an opportunity to use the secondary communication service and utilize limited resources more efficiently.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, a description will be given in the order presented below.

Figure 1:
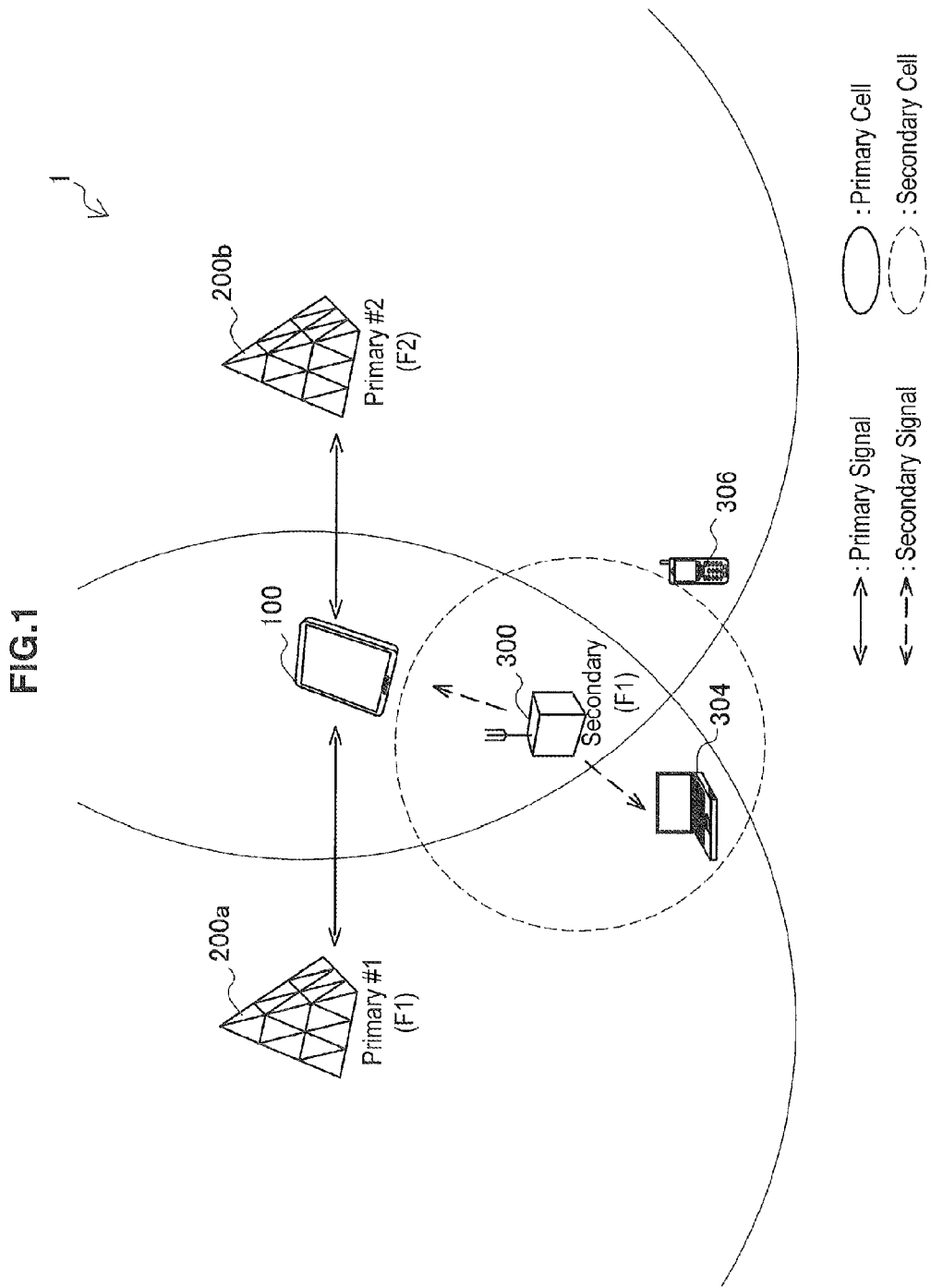
FIG. 1 is an explanatory diagram for explaining an overview of a communication system according to an embodiment.

1. Overview of System
2. Exemplary Configuration of Terminal Device according to Embodiment
3. Exemplary Configuration of Communication Control Device (Primary side) according to Embodiment
4. Exemplary Configuration of Communication Control Device (Secondary side) according to Embodiment
5. Exemplary Flow of Process according to Embodiment
6. Modification
7. Summary 1. Overview of System FIG. 1 is an explanatory diagram for explaining an overview of a communication system 1 according to an embodiment. Referring to FIG. 1, the communication system 1 includes a terminal device 100, a communication control device 200a, a communication control device 200b, and a communication control device 300.

The terminal device 100 is a wireless communication terminal that can use a plurality of primary communication services. Each primary communication service used by the terminal device 100 identifies each individual subscriber by using SIM information transmitted from the terminal device 100. The terminal device 100 may typically be a so-called dual SIM terminal that is a form of a multi-SIM terminal. The terminal device 100, when using a first primary communication service, is connected to the first primary communication service by using first SIM information. On the other hand, the terminal device 100, when using a second primary communication service that is different from the first primary communication service, is connected to the second primary communication service by using second SIM information that is different from the first SIM information. Such switching of SIM information in the terminal device 100 may be performed in various ways as will be described later. The terminal device 100 may be a wireless communication terminal, for example, such as smart phones, PCs (Personal Computers), tablet computers, PDAs (Personal Digital Assistants), or PNDs (Portable Navigation Devices).

The communication control device 200a is a device for providing the first primary communication service to one or more terminal devices including the terminal device 100. The first primary communication service may be a communication service that is provided according to any type of wireless communication systems, for example, such as GSM (Global System for Mobile Communications), W-CDMA (Wideband-Code Division Multiple Access), WiMAX, LTE, or LTE-A. In the example illustrated in FIG. 1, a frequency channel F1 is assigned to the first primary communication service.

The communication control device 200b is a device for providing the second primary communication service different from the first primary communication service to one or more terminal devices including the terminal device 100. The second primary communication service may also be a communication service provided according to any kind of wireless communication systems, for example, such as GSM, W-CDMA, WiMAX, LTE, or LTE-A. In the example illustrated in FIG. 1, a frequency channel F2 is assigned to the second primary communication service.

FIG. 1 illustrates an example where the communication control devices 200a and 200b are base stations of a cellular communication system. However, the communication control devices 200a and 200b described in the present embodiment are not limited to this example, and they may be a control node (e.g., a server device connected to a core network) which is configured separately from the base station.

In the present specification, the primary communication service refers to a wireless communication service in which the use of frequency resources is explicitly allowed (e.g., based on the regulation of each country). However, assignment of frequency resources to the primary communication service may not necessarily be carried out optimally from the viewpoint of the increase in communication opportunities. For example, in a region where users of a primary communication service do not exist actually (a few or not at all), there is a possibility that frequency resources are assigned to the primary communication service. In this case, if the frequency resources assigned to the primary communication service are not available at all by other wireless communication services, this means communication opportunities of the user are lost, which is undesirable. Therefore, secondary use of the frequency resources assigned to the primary communication service by other wireless communication services is allowed under given conditions. The given conditions include, for example, a condition that does not give any substantial interference to a receiving station of the primary communication service. The secondary communication service mentioned herein refers to a wireless communication service that is provided by the secondary use of a frequency resource assigned to the primary communication service in this way. If the primary communication service makes an integrated use of a plurality of frequency channels using a carrier aggregation technique such as, for example, an LTE-A system, the secondary communication services may secondarily use only some channels of the plurality of frequency channels.

The communication control device 300 is a device that provides the secondary communication service to one or more terminal devices including a terminal device 304 at least near an area where the first primary communication service is provided. The secondary communication service may be, for example, a communication service provided in accordance with any kind of wireless communication systems such as a wireless LAN (Local Area Network) or UWB (Ultra Wide Band). In the example illustrated in FIG. 1, the secondary communication service that is provided by the communication control device 300 secondarily uses the frequency channel F1 assigned to the first primary communication service. Therefore, the communication control device 300, when providing the secondary communication service, controls a transmission power of a wireless signal to be transmitted for the secondary communication service so that the wireless signal may not give any substantial interference to a receiving station (e.g., the terminal device 100) of the first primary communication service. In FIG. 1, there is illustrated an example where the communication control device 300 is a master node (e.g., a wireless access point, a femtocell base station, etc.) for a secondary communication service. However, the communication control device 300, which is not limited to this example, may be a server device or the like provided to control such a master node.

The terminal device 304 is a wireless communication terminal that uses secondary communication service provided by the communication control device 300. A terminal device 306 is a wireless communication terminal that wants to use the secondary communication service provided by the communication control device 300. However, the frequency channel of wireless signals transmitted from the communication control device 300 overlaps with the frequency channel assigned to the first primary communication service. For that reason, if the communication control device 300 increases the transmission power of the wireless signal transmitted from the communication control device 300 to the extent in which the terminal device 306 successfully receives the wireless signal, then there is a risk that the wireless signal gives excessive interference to the terminal device 100. Accordingly, the transmission power is suppressed by the communication control device 300, and thus the secondary communication service is not available by the terminal device 306. In addition, the suppression of transmission power of the secondary communication service also means that the bit rate of the secondary communication service accepted by the terminal device 304 can become low. Such a situation is not preferable from the viewpoint of the increase in communication opportunities. Thus, in the communication system 1 according to the present embodiment, such a situation is improved preferably and a more efficient utilization of frequency resources is implemented by a mechanism which will be described in detail in the following sections.

In the following description, when it is not necessary to distinguish the communication control devices 200a and 200b from each other, they will be collectively referred to as the communication control device 200 by omitting the alphabet at the end of the reference sign. This will also be applied for other elements.

2. Exemplary Configuration of Terminal Device according to Embodiment

Figure 2:
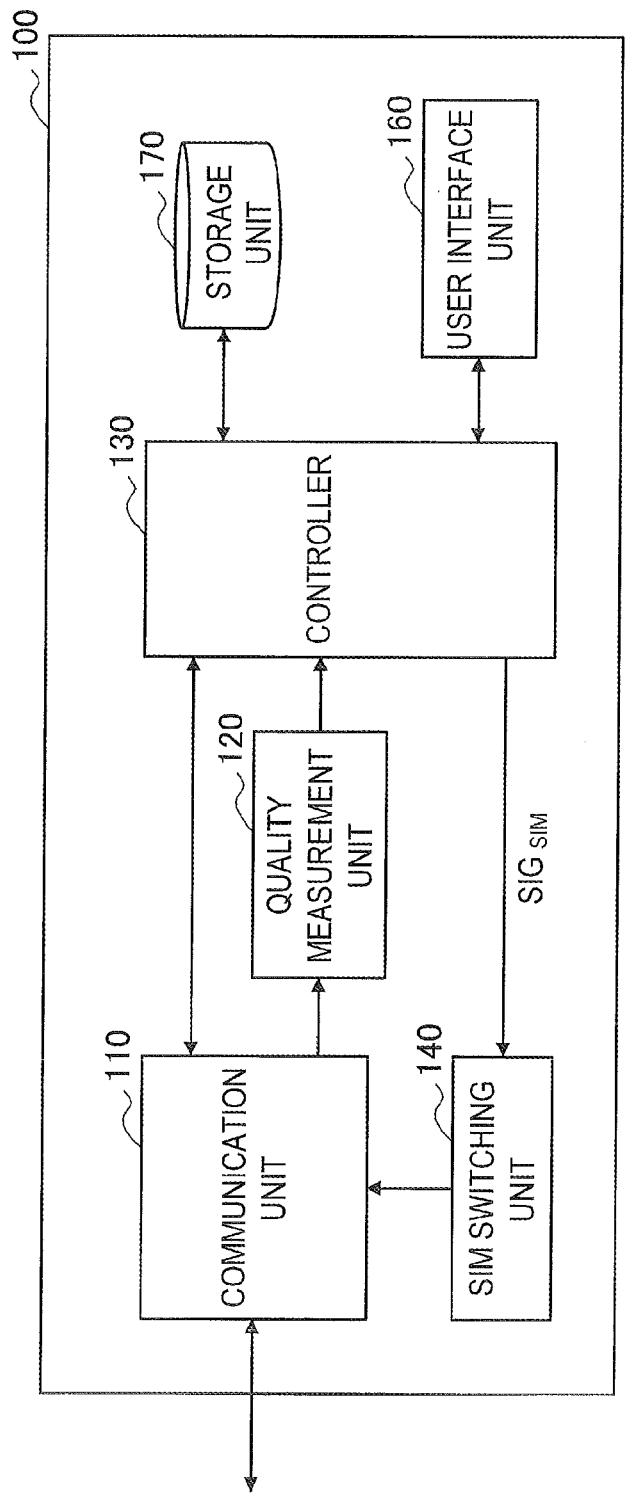
FIG. 2 is a block diagram illustrating an exemplary configuration of a terminal device using a primary communication service in accordance with an embodiment.

FIG. 2 is a block diagram illustrating an exemplary configuration of the terminal device 100 according to the present embodiment. Referring to FIG. 2, the terminal device 100 includes a communication unit 110, a quality measurement unit 120, a controller 130, a SIM switching unit 140, a user interface unit 160, and a storage unit 170.

(1) Communication Unit

The communication unit 110 is a communication interface that performs wireless communication by using any SIM information that is switched between a plurality of SIM information corresponding respectively to a plurality of primary communication services. When the first SIM information is selected in the SIM switching unit 140, the communication unit 110 is connected to the first primary communication service provided by the communication control device 200a. In addition, when the second SIM information is selected in the SIM switching unit 140, the communication unit 110 is connected to the second primary communication service provided by the communication control device 200b. In the following description, for the purpose of simplicity of explanation, as an example, it is assumed that the communication unit 110 is currently connected to the first primary communication service provided by the communication control device 200a.

(2) Quality Measurement Unit

The quality measurement unit 120 measures the quality of wireless communication performed by the communication unit 110. The quality measurement unit 120 measures, for example, the reception power level of the pilot signal, reference signal, or other signals received at a predetermined time slot in each primary communication service. The reception power level may be averaged over a predetermined period of time. In addition, the quality measurement unit 120 calculates, for example, the Signal-to-Interference and Noise power Ratio (SINR) from the measured reception power level. In addition, or alternatively, the quality measurement unit 120 may calculate, for example, parameters such as bit error rate (BER) or frame error rate (FER). The quality measurement unit 120 then outputs values for one or more parameters of these parameters representative of the quality of wireless communication to the controller 130.

The quality measurement unit 120 periodically measures the communication quality of the primary communication service being connected (i.e., the first primary communication service). The result obtained by causing the quality measurement unit 120 to measure the communication quality is reported to a base station (e.g., the communication control device 200a) of the primary communication service being connected. In addition, a common terminal device, which performs wireless communication in accordance with W-CDMA scheme, LTE scheme, or LTE-A scheme of HSDPA-compatible or later version, periodically measures the channel quality and reports the measurement result to a base station, according to the standard specifications. The measurement result being reported is called a channel quality indicator (CQI). The quality measurement unit 120 may use a parameter included in the CQI as the measurement result of communication quality.

The measurement of communication quality for the primary communication service being disconnected (i.e., the second primary communication service) by the quality measurement unit 120 can be performed when the communication quality measured for the primary communication service being connected is lower than a given threshold. Then, when the communication quality of the primary communication service being disconnected is higher than the communication quality of the primary communication service being connected, SIM information can be switched in the SIM switching unit 140. In other words, the measurement of communication quality for the primary communication service being disconnected can be performed only when the communication quality for the primary communication service being connected is reduced in order to determine whether to switch SIM information. According to such a configuration, the frequency of switching of SIM information and switching of communication setting (e.g., operating frequency, etc.) in the communication unit 110 can be lowered, and hardware resources of the terminal device 100 can be utilized efficiently for data communication.

The given threshold to be compared with the communication quality of the primary communication service being connected may be a different value for each cell type of the primary communication service. A cell type can be specified based on information (e.g., cell ID associated with a cell type, or cell type itself) received on a control channel. A cell type of the primary communication service, for example, may be a type for distinguishing between macrocells, picocells, femtocells, or the like, or may be a type for distinguishing cells that are extended by means of a relay station, a repeater, or the like. It is possible to keep a proper balance between selection of the optimal primary communication service by the terminal device 100 and reduction in the operation overhead, for example, by setting a threshold for a cell that is easier to vary in its communication quality to a lower value. Mapping between the threshold and the cell type may be provided from the communication control device 200 to the terminal device 100 or may be provided the communication control device 300 to the terminal device 100.

(3) Controller

The controller 130 controls the overall operation of the terminal device 100 by using a processor such as CPU (Central Processing Unit) or DSP (Digital Signal Processor). For example, the controller 130 generates a data packet to be transmitted to another terminal device via a base station of the primary communication service, and processes a data packet to be received from another terminal device via a base station of the primary communication service.

Further, in the present embodiment, the controller 130 controls the switching of SIM information to be performed in the SIM switching unit 140. The switching of SIM information in the SIM switching unit may be performed for a variety of reasons.

For example, the controller 130 compares the communication quality measured by the quality measurement unit 120 for the connected primary communication service with the given threshold. Then, when the measured communication quality is lower than the given threshold, the controller 130 can cause the quality measurement unit 120 to measure communication quality for the primary communication service being disconnected. When the communication quality of the primary communication service being disconnected is higher than the communication quality of the primary communication service being connected, the controller 130 can output a SIM switching instruction signal $SIG_{SIM}$ to the SIM switching unit 140.

Moreover, for example, the controller 130 reports the communication quality measured for the primary communication service being connected (or communication quality for both the primary communication services being connected and being disconnected) to the communication control device 200a via the communication unit 110. The report to the communication control device 200a may contain data related to position information of the terminal device 100. The communication control device 200a instructs the terminal device 100 to switch SIM information based on the report (or other factors) from the terminal device 100. The controller 130, when receiving the instruction of switching of SIM information through the communication unit 110, may output the SIM switching instruction signal $SIG_{SIM}$ to the SIM switching unit 140.

Furthermore, for example, the controller 130 receives a request for switching the communication service from the user through the user interface unit 160. The user may make a request for switching the communication service, for example, for various reasons such as the purpose of communications (for business/private use, etc.), cost, or quality. Upon receiving the request for switching the communication service from the user, the control unit 110 may output the SIM switching instruction signal $SIG_{SIM}$ to the SIM switching unit 140.

Further, in the present embodiment, when SIM information used by the communication unit 110 is switched, the controller 130 reports the switching of SIM information to the communication control device 300 for controlling the transmission power of a secondary communication service. The communication control device 300 that is a destination to be reported is a device for controlling the transmission power of the secondary communication service provided on a frequency channel that is at least partially shared inside or near an area where the primary communication service before switching (i.e., the first communication service) is provided. The switching may be reported through the communication control device 200a or 200b, or may be directly reported to the communication control device 300. The communication control device 300 increases the transmission power of the secondary communication service in accordance with the report of the switching. Instead of causing the controller 130 of the terminal device 100 to report the switching of SIM information to the communication control device 300, the communication control device 200a or 200b may notify the switching of SIM information in the terminal device 100 to the communication control device 300.

(4) SIM Switching Unit

The SIM switching unit 140 stores SIM information used by the communication unit 110 by means of a storage medium. The SIM switching unit 140, when receiving the SIM switching instruction signal $SIG_{SIM}$ from the controller 130, switches the SIM information used by the communication unit 110.

Figure 3:
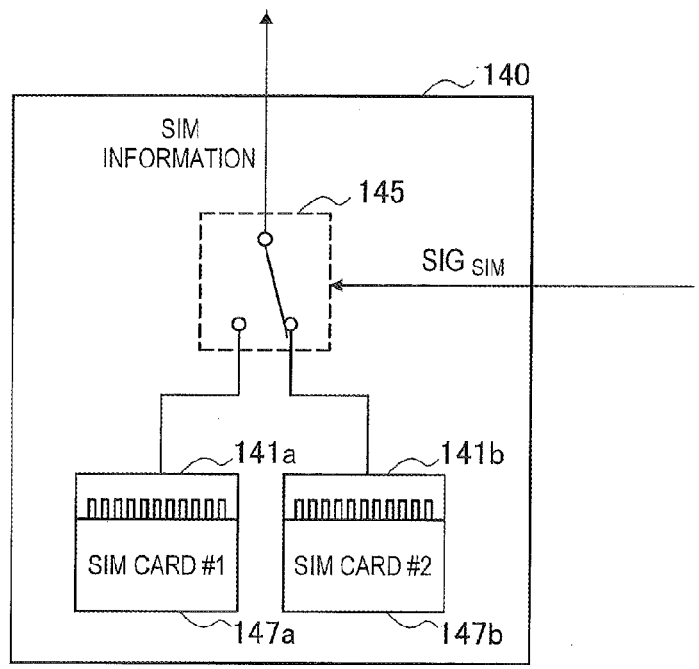
FIG. 3 is a block diagram illustrating a first example of the detailed configuration of a SIM switching unit illustrated in FIG. 2.

FIG. 3 is a block diagram illustrating a first example of the detailed configuration of the SIM switching unit 140. Referring to FIG. 3, the SIM switching unit 140 includes a first SIM card slot 141a, a second SIM card slot 141b, and a selection unit 145. The first SIM card slot 141a has a SIM card 147a attached thereto, which stores the first SIM information. The second SIM card slot 141b has a SIM card 147b attached thereto, which stores the second SIM information. The selection unit 145 selectively connects the SIM card slot specified by the SIM switching instruction signal $SIG_{sim}$ inputted from the controller 130 to the communication unit 110, and thus the selection unit 145 switches SIM information to be used by the communication unit 110. Further, the number of the SIM card slots, which is not limited to the example of FIG. 3, may be three or more.

Figure 4:
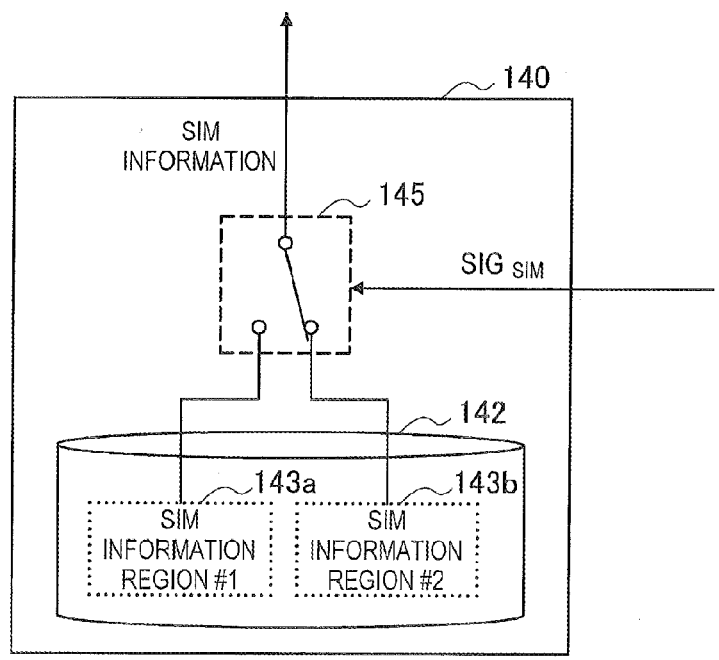
FIG. 4 is a block diagram illustrating a second example of the detailed configuration of the SIM switching unit illustrated in FIG. 2.

FIG. 4 is a block diagram illustrating a second example of the detailed configuration of the SIM switching unit 140. Referring to FIG. 4, the SIM switching unit 140 includes a SIM information storage unit 142 and the selection unit 145. The SIM information storage unit 142 has a storage region including a first SIM information region 143a and a second SIM information region 143b. The first SIM information region 143a stores first SIM information. The second SIM information region 143b stores second SIM information. The selection unit 145 selectively reads SIM information from the storage region specified by the SIM switching instruction signal $SIG_{sim}$ inputted from the controller 130 and then outputs the read SIM information to the communication unit 110, and thus the selection unit 145 switches SIM information to be used by the communication unit 110. Further, the number of the SIM information regions, which is not limited to the example of FIG. 4, may be three or more.

Figure 5:
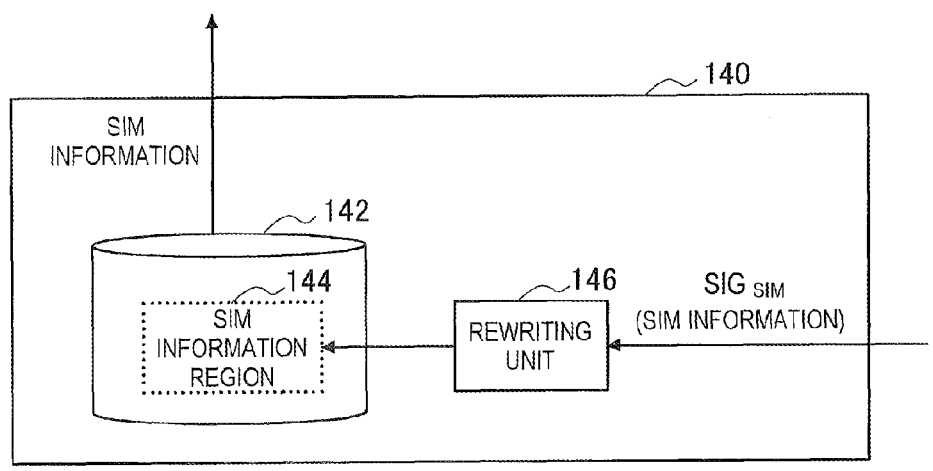
FIG. 5 is a block diagram illustrating a third example of the detailed configuration of the SIM switching unit illustrated in FIG. 2.

FIG. 5 is a block diagram illustrating a third example of the detailed configuration of the SIM switching unit 140. Referring to FIG. 5, the SIM switching unit 140 includes the SIM information storage unit 142 and a rewriting unit 146. The SIM information storage unit 142 includes a single SIM information region 144. The SIM information region 144 stores any one of a plurality of SIM information. SIM information stored in the SIM information region 144 is read at the time of communication by the communication unit 110. The rewriting unit 146 switches SIM information to be used by the communication unit 110 by rewriting the SIM information of the SIM information region 144 into the SIM information contained in the SIM switching instruction signal $SIG_{sim}$ inputted from the controller 130.

(5) User Interface Unit

The user interface unit 160 provides a user interface that may include an input interface, a screen interface, a voice interface, or the like to the user of the terminal device 100. The user interface unit 160, for example, displays a screen that indicates whether the terminal device 100 is currently connected to any communication service of a plurality of primary communication services on a display. In addition, the user interface unit 160 may display a screen that indicates a result obtained by measuring the communication quality of the primary communication service being connected on a display. When the user interface unit 160 receives a request for switching of communication service from the user via an input interface such as a touch panel, keypad, keyboard, pointing device, or buttons, the user interface unit 160 outputs the request to the controller 130.

(6) Storage Unit

The storage unit 170 stores programs and data used for the operation of the terminal device 100 by using a storage medium such as hard disk or semiconductor memory.

Note that these elements of the terminal device 100 illustrated in FIG. 2 are merely illustrative examples. That is, the terminal device 100 may be additionally provided with an element that is not shown, and some elements may be omitted from the configuration of the terminal device 100.

Figure 6:
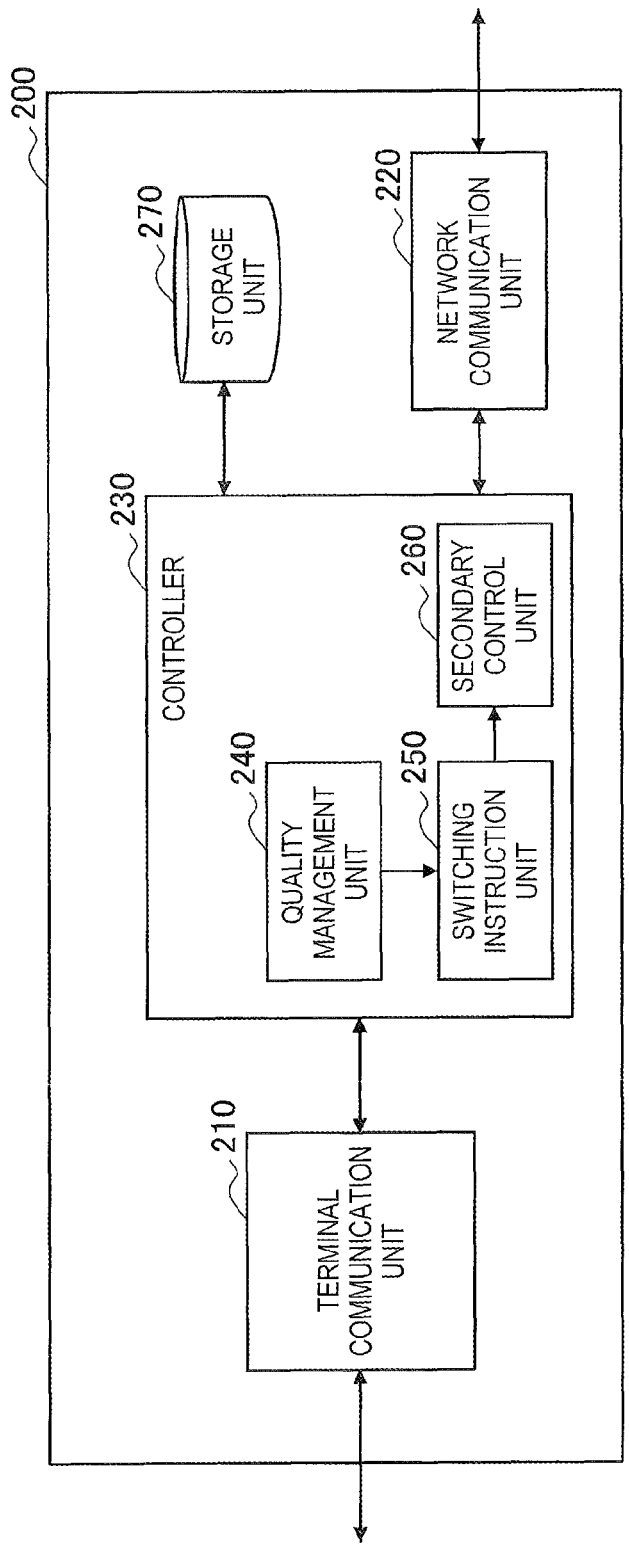
FIG. 6 is a block diagram illustrating an exemplary configuration of a communication control device for providing a primary communication service in accordance with an embodiment.

3. Exemplary Configuration of Communication Control Device (Primary Side) According to Embodiment FIG. 6 is a block diagram illustrating an exemplary configuration of the communication control device 200 according to the present embodiment. Referring to FIG. 6, the communication control device 200 includes a terminal communication unit 210, a network communication unit 220, a controller 230, and a storage unit 270.

(1) Terminal Communication Unit

The terminal communication unit 210 is a communication interface that performs wireless communication with one or more terminal devices (including the terminal device 100) connected to the primary communication service provided by the communication control device 200 on a frequency channel assigned to the primary communication service. The terminal communication unit 210, for example, schedules communication to be performed by each terminal device. The terminal communication unit 210 then receives an uplink signal from each terminal device or transmits a downlink signal to each terminal device, in accordance with the schedule. The plurality of terminal devices that may be connected to the primary communications service are may be multiplexed by using any multiple access scheme such as CDMA (Code Division Multiple Access) scheme, OFDMA (Orthogonal Frequency Division Multiple Access) scheme, or TDMA (Time Division Multiple Access) scheme. Furthermore, the terminal communication unit 210, for example, broadcasts control information such as cell ID or cell type of the primary communication service on a control channel of the downlink.

(2) Network Communication Unit

The network communication unit 220 is a communication interface that is connected to a network such as core network or the Internet of the primary communication service provided by the communication control device 200. If each of the communication control device 200 and the communication control device 300 is configured as a separate device, the communication control unit 200 can communicate with the communication control device 300 via the network communication unit 220. The communication via the network communication unit 220 may be wired communication or may be wireless communication.

(3) Controller

The controller 230 controls the overall operation of the communication control device 200 by using a processor such as CPU or DSP. In this embodiment, the controller 230 includes a quality management unit 240, a switching instruction unit 250, and a secondary control unit 260.

The quality management unit 240 manages a communication quality of the primary communication service provided by the communication control device 200. For example, the quality management unit 240 monitors the communication quality (e.g., reception power level, CQI, SNR, BER or FER, or an average value thereof) reported from the terminal device 100 and the position of the terminal device 100. The quality management unit 240 then determines whether terminal device 100 is necessary to switch the primary communication service. For example, if the communication quality of the second primary communication service is better than the communication quality of the reported first primary communication service, the quality management unit 240 may determine that the terminal device 100 is necessary to switch the primary communication service. In addition, if the terminal device 100 is located near the cell edge, the quality management unit 240 may determine that the terminal device 100 is necessary to switch the primary communication service.

If the quality management unit 240 determines that the terminal device 100 is necessary to switch the primary communication service, the switching instruction unit 250 instructs the terminal device 100 to switch from the SIM information corresponding to the first primary communication service being connected to the SIM information corresponding to the second primary communication service. For example, the instruction of the switching instruction unit 250 to the terminal device 100 may be performed on a control channel of the primary communication service, or may be performed on other channels.

The secondary control unit 260 controls a control node of the secondary communication service that uses secondarily at least a portion of the frequency channels assigned to the primary communication service provided by the communication control device 200. In the present embodiment, the control node controlled by the secondary control unit 260 includes the communication control device 300 that provides the secondary communication service near a service area of the first and second primary communication services. For example, when the switching of SIM information is instructed from the switching instruction unit 250 to the terminal device 100, the secondary control unit 260 notifies the switching to the communication control device 300. In addition, when the voluntary switching of SIM information is reported from the terminal device 100, the secondary control unit 260 may notify the switching of SIM information by the terminal device 100 to the communication control device 300. As a result, the transmission power of the secondary communication service may be increased by the communication control device 300.

Furthermore, the secondary control unit 260 may notify a position of the relevant terminal device and a tolerable interference level to the communication control device 300 according to the switching of SIM information or emergence of a new terminal device to be connected to the primary communication service. The communication control device 300 controls the transmission power of the secondary communication service based on the information notified from the secondary control unit 260 in this way.

(4) Storage Unit

The storage unit 270 stores programs and data used for the operation of the communication control device 200 by using a storage medium such as hard disk or semiconductor memory.

Figure 7:
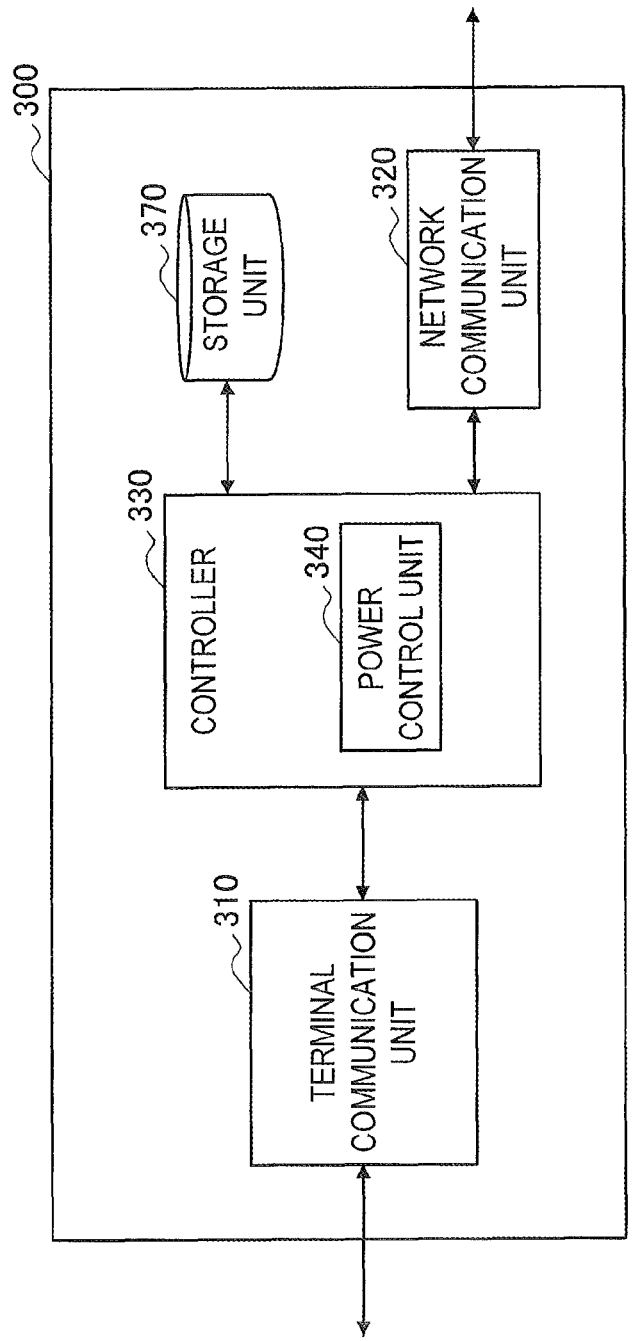
FIG. 7 is a block diagram illustrating an exemplary configuration of a communication control device for providing a secondary communication service in accordance with an embodiment.

4. Exemplary Configuration of Communication Control Device (Secondary Side) According to Embodiment FIG. 7 is a block diagram illustrating an exemplary configuration of the communication control device 300 according to the present embodiment. Referring to FIG. 7, the communication control device 300 includes a terminal communication unit 310, a network communication unit 320, a controller 330, and a storage unit 370.

(1) Terminal Communication Unit

The terminal communication unit 310 is a communication interface that performs wireless communication with one or more terminal devices connected to the secondary communication service provided by the communication control device 300 on at least some of frequency channels assigned to a primary communication service. The terminal communication unit 310 may multiplex the terminal device, for example, by using any multiple access scheme such as CDMA scheme, OFDMA scheme, or TDMA scheme. Instead, in the secondary communication service, for example, collision of wireless signals may be avoided by using CSMA/CA (Carrier Sense Multiple Access/Collision Avoidance) scheme.

(2) Network Communication Unit

The network communication unit 320 is a communication interface connected to a network such as the Internet. The communication via the network communication unit 320 may be wired communication, or may be wireless communication.

(3) Controller

The controller 330 controls the overall operation of the communication control device 300 by using a processor such as CPU or DSP. In the present embodiment, the controller 330 includes a power control unit 340.

The power control unit 340 controls the transmission power of the secondary communication service provided by the communication control device 300. As illustrated in FIG. 1, in the present embodiment, the secondary communication service to be provided by the communication control device 300 is provided at least near an area where the first and second primary communication services are provided. In addition, the secondary communication service is provided on at least some channels of the frequency channels assigned to the first primary communication service. Accordingly, the power control unit 340 controls the transmission power of the secondary communication service so that an interference level to the first primary communication service which caused by wireless signals of the secondary communication service does not exceed a predetermined allowable interference level.

For example, the power control unit 340 obtains the position and allowable interference level of the terminal device 100 that is a primary receiving station from the communication control device 200$a$. The power control unit 340 then calculates an upper limit of the transmission power such that a wireless signal of the secondary communication service does not give the interference of a level exceeding the allowable interference level to the terminal device 100, by using a value of the allowable interference level and the distance between the secondary sending station and the terminal device 100. The power control unit 340 notifies the upper limit of the transmission power that is calculated in this way to each secondary sending station. As a result of control of the transmission power, for example, if it is determined that the provision of services is interrupted because a sufficient transmission power may not be obtained or a similar reason, the power control unit 340 may recommend a handover from the secondary communication service used by the terminal device to other communication services for the terminal device. The other communication services may be any of primary communication services, or other secondary communication services that use a different frequency channel. Thereby, it is possible to avoid the unexpected interruption of communication in the terminal device that uses a secondary communication service. The power control unit 340 may calculate the allowable interference level by using the distance between the primary sending station and the terminal device 100, instead of obtaining the allowable interference level from the communication control device 200a.

Furthermore, in the present embodiment, when the switching from the SIM information corresponding to the first primary communication service to the SIM information corresponding to the second primary communication service is performed in the terminal device 100, the power control unit 340 increase the transmission power of the secondary communication service. For example, when the switching of SIM information is notified from the communication control device 200a or is reported from the terminal device 100 to the power control unit 340, the power control unit 340 recognizes that the frequency channel used by the terminal device 100 has been changed from a channel F1 to a channel F2. The power control unit 340 then recalculates an upper limit of the transmission power of the secondary communication service by using the allowable interference level which may be newly obtained from a communication control device 200a by being linked to the switching of SIM information. As a result, the upper limit of the transmission power of the secondary communication service using the frequency channel F1 can be increased. In the present specification, the increase in the transmission power of the secondary communication service means that not only the value of the transmission power during providing service may be further enhanced, but also the secondary communication service that has been stopped may be initiated together with some values of transmission power.

(4) Storage Unit

The storage unit 370 stores programs and data used for the operation of the communication control device 300 by using a storage medium such as hard disk or semiconductor memory.

5. Exemplary Flow of Process According to Embodiment

Figure 8:
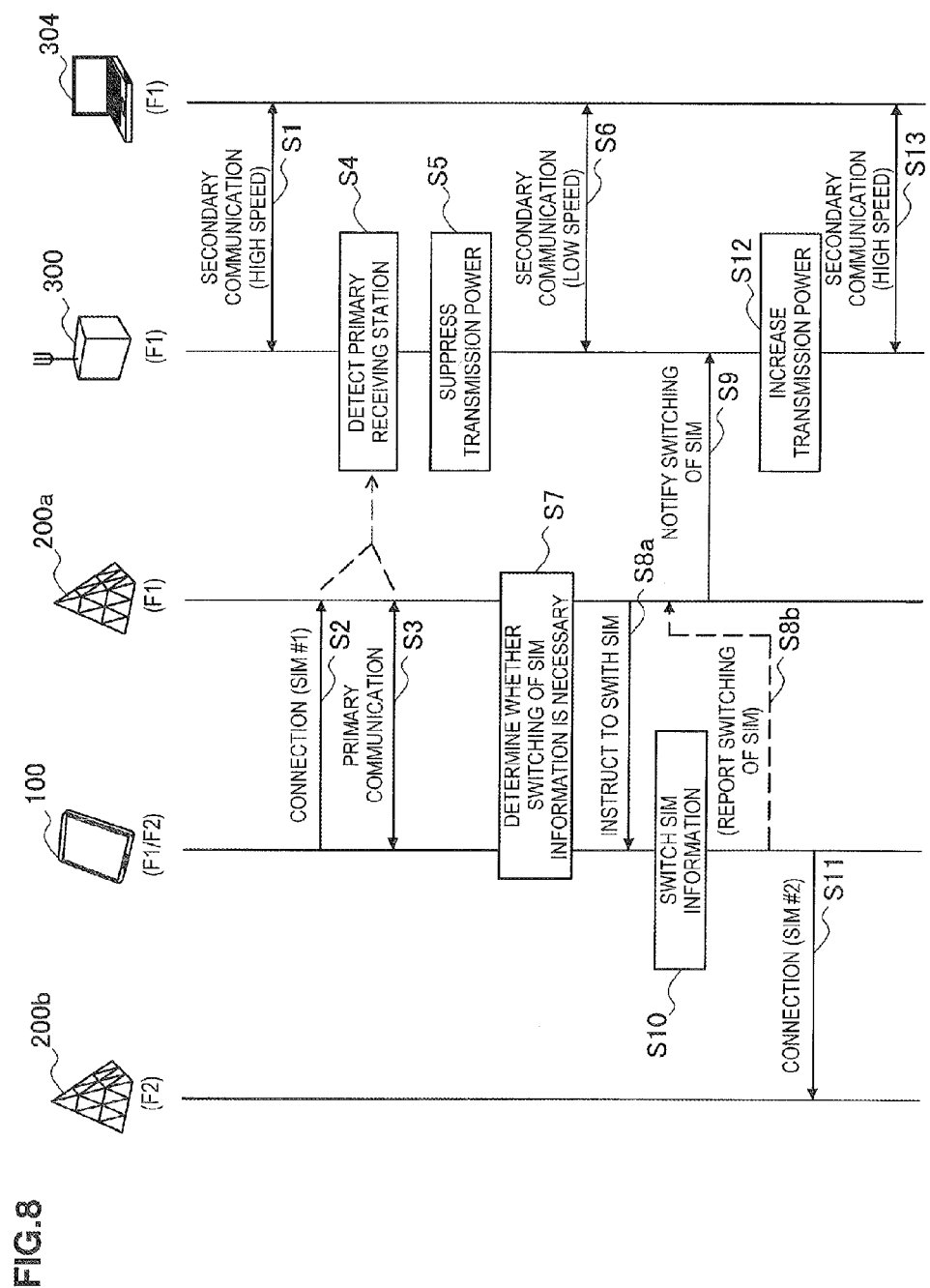
FIG. 8 is a sequence diagram illustrating an exemplary flow of a communication control process according to an embodiment.

FIG. 8 is a sequence diagram illustrating an exemplary flow of a communication control process according to the present embodiment. Referring to FIG. 8, there is illustrated the flow of processes to be performed between the terminal device 100, the communication control device 200a, the communication control device 200b, the communication control device 300, and the terminal device 300, which are shown in FIG. 1.

First, the terminal device 304 transmits and receives a wireless signal by using the secondary communication service provided by the communication control device 300 (step S1). In this situation, for example, it is assumed that the terminal device 100 transmits a connection request to the communication control device 200a, and is connected to the first primary communication service (step S2). Thereafter, a wireless signal of the first primary communication service is transmitted and received between the terminal device 100 and the communication control device 200a (Step S3).

When the communication control device 300 detects that the terminal device 100 that is a primary receiving station is appeared in the vicinity thereof (step S4), the communication control device 300 suppresses the transmission power of the secondary communication service in order not to give excessive interference to the terminal device 100 (step S5). At this time, for example, when there is a secondary terminal determined that the desired quality of service may not be maintained as a result of suppression of the transmission power, the power control unit 340 of the communication control device 300 may recommend a handover to other communication services to the secondary terminal. In the example of FIG. 8, the terminal device 304 then continues the secondary communication by the suppressed transmission power (step S6). However, since the transmission power is suppressed, the bit rate that is experienced by the terminal device 304 in step S6 is lower than the bit rate that is experienced in step S1.

Subsequently, the terminal device 100 or the communication control device 200a determines whether the switching of SIM information to be used in the terminal device 100 is necessary depending on the communication quality of the first primary communication service (step S7). Here, if it is determined that the switching of SIM information is necessary, for example, the switching instruction unit 250 of the communication control device 200a instructs the terminal device 100 to switch SIM information (step S8a). Alternatively, the switching of SIM information may be reported from the terminal device 100 to the communication control device 200a (step S8b). The secondary control unit 260 of the communication control device 200a notifies the switching to the communication control device 300 depending on the switching of SIM information in the terminal device 100 (step S9). Instead of step S9, the secondary control unit 260 of the communication control device 200a performs calculation of the transmission power of the secondary communication service, and the calculated value of the transmission power may be notified from the secondary control unit 260 to the communication control device 300.

The SIM switching unit 140 of the terminal device 100, when receiving the SIM switching instruction signal $SIG_{SIM}$ from the controller 130, switches the SIM information used by the communication unit 110 (step S10). In this example, the SIM information corresponding to the first primary communication service is switched to the SIM information corresponding to the second primary communication service. The communication unit 110 then transmits a connection request to the communication control device 200b by using the switched SIM information, and is connected to the second primary communication service (step S11).

On the other hand, the power control unit 340 of the communication control device 300, when recognizing that the SIM information is switched in the terminal device 100, recalculates the transmission power, and then increases the transmission power of the secondary communication service (step S12). As a result, it becomes possible for the terminal device 304 to use the secondary communication service at a higher bit rate by using the increased transmission power (Step S13). In addition, it is also possible to provide the secondary communication service to a secondary terminal which is located in a wider area.

Figure 9:
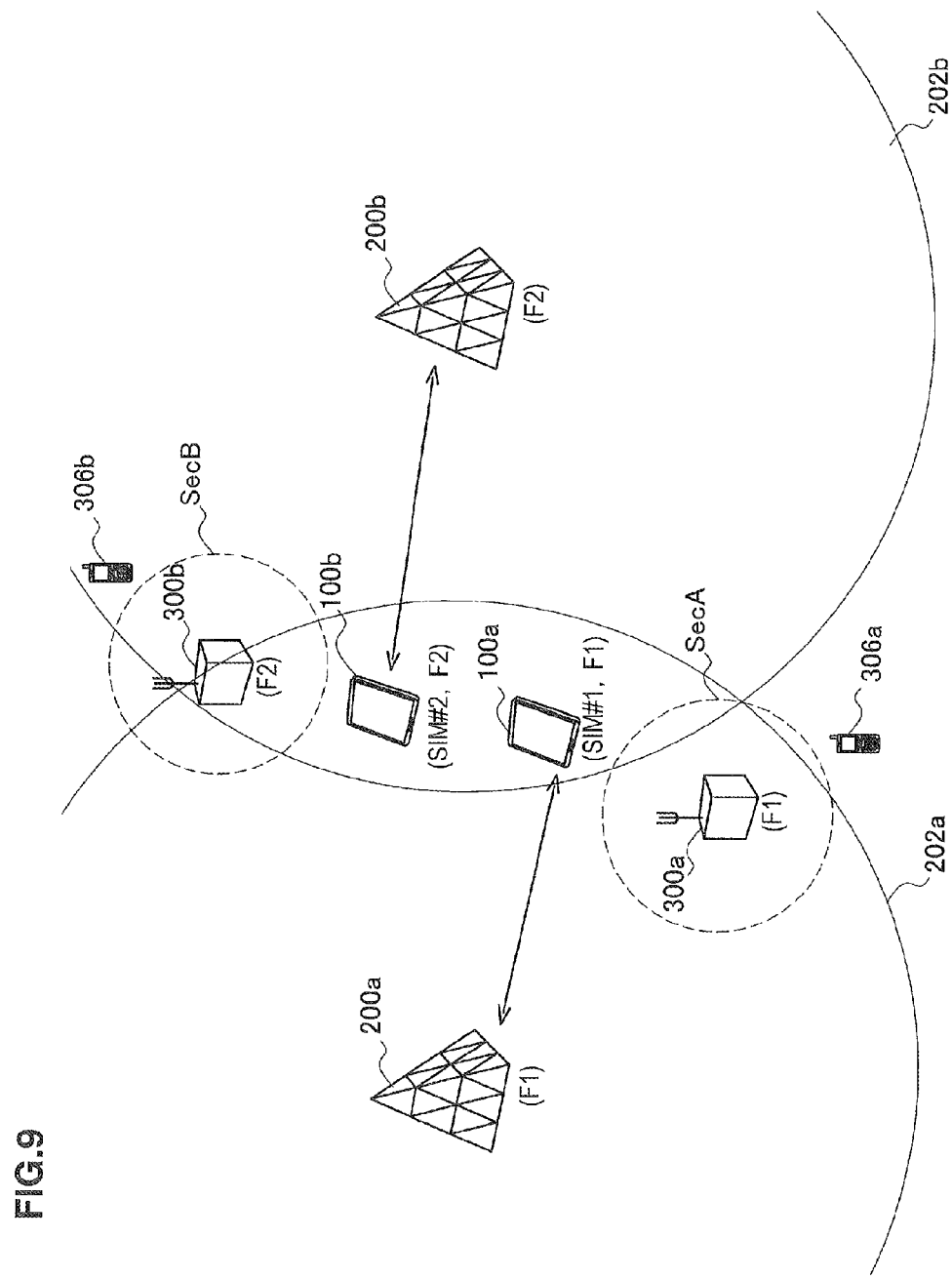
FIG. 9 is a first explanatory diagram for explaining the expansion of an opportunity to use a secondary communication service as a result of performing the communication control process according to an embodiment.
Figure 10:
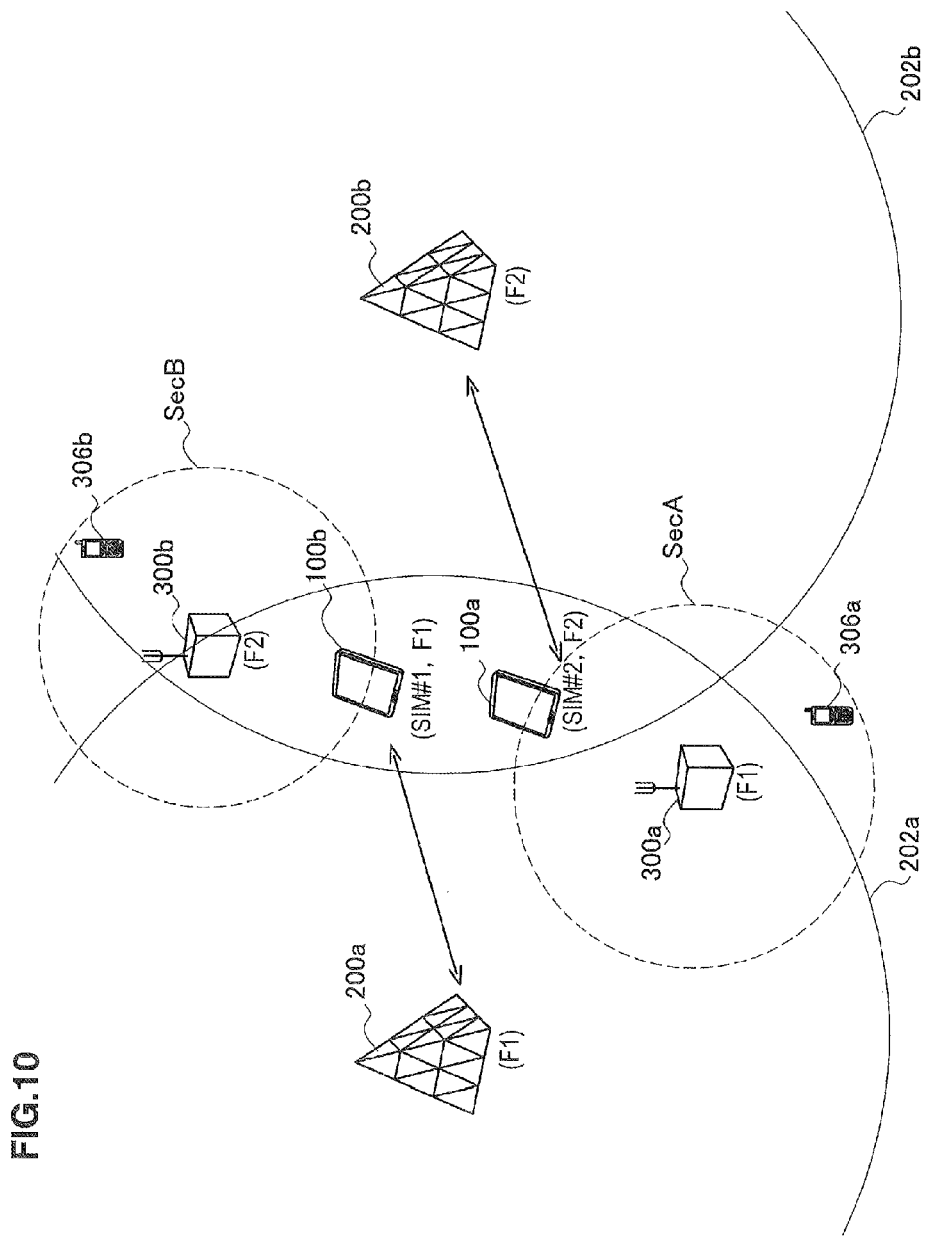
FIG. 10 is a second explanatory diagram for explaining the expansion of an opportunity to use a secondary communication service as a result of performing the communication control process according to an embodiment.

FIGS. 9 and 10 illustrate how an opportunity to use the secondary communication service is expanded as the result of the communication control processing as illustrated in FIG. 8.

Referring to FIG. 9, the communication control device 200a provides the first primary communication service on the frequency channel F1. The terminal device 100a is connected to the first primary communication service by using the first SIM information. The communication control device 300a is located relatively close to the terminal device 100a, and provides a secondary communication service SecA by secondarily using the frequency channel F1. The communication control device 300a maintains the service area of the secondary communication service SecA in a narrow range so as not to give excessive interference to the terminal device 100a. A terminal device 306a is located outside the service area of the secondary communication service SecA, and thus the secondary communication service SecA is not available by the terminal device 306a. On the other hand, the communication control device 200b provides the second primary communication service on the frequency channel F2. The terminal device 100b is connected to the second primary communication service by using the second SIM information. The communication control device 300b is located relatively close to the terminal device 100b, and provides a secondary communication service SecB by secondarily using the frequency channel F2. The communication control device 300b maintains the service area of the secondary communication service SecB in a narrow range so as not to give excessive interference to the terminal device 100b. A terminal device 306b is located outside the service area of the secondary communication service SecB, and thus the secondary communication service SecB is not available by the terminal device 306b.

FIG. 10 illustrates a state after the communication control process as illustrated in FIG. 8 is performed in the case of FIG. 9. For example, the terminal device 100a switches SIM information from the first SIM information to the second SIM information, and is newly connected to the second primary communication service. Then, as the result of causing the communication control device 300a to control the transmission power, the service area of the secondary communication service SecA using a different frequency channel from the second primary communication service is expanded. In the case of FIG. 10, the terminal device 306a is located within the service area of the secondary communication service SecA, and thus the terminal device 306a can use the secondary communication service SecA. Similarly, the terminal device 100b switches SIM information from the second SIM information to the first SIM information, and is newly connected to the first primary communication service. Then, as the result of causing the communication control device 300b to control the transmission power, the service area of the secondary communication service SecB using a different frequency channel from the first primary communication service is expanded. In the case of FIG. 10, the terminal device 306b is located within the service area of the secondary communication service SecB, and thus the terminal device 306b can use the secondary communication service SecB.

6. Modification

An example where the communication control devices 200a, 200b, and 300 are each configured as a separate device has been mainly described above. However, two or more of these devices may be implemented as the same device. For example, if the first primary communication service and the secondary communication service are provided by the same carrier, the communication control device 200a and the communication control device 300 may be implemented as the same device. In this section, referring to FIG. 11, one example of such a modification will be described.

Figure 11:
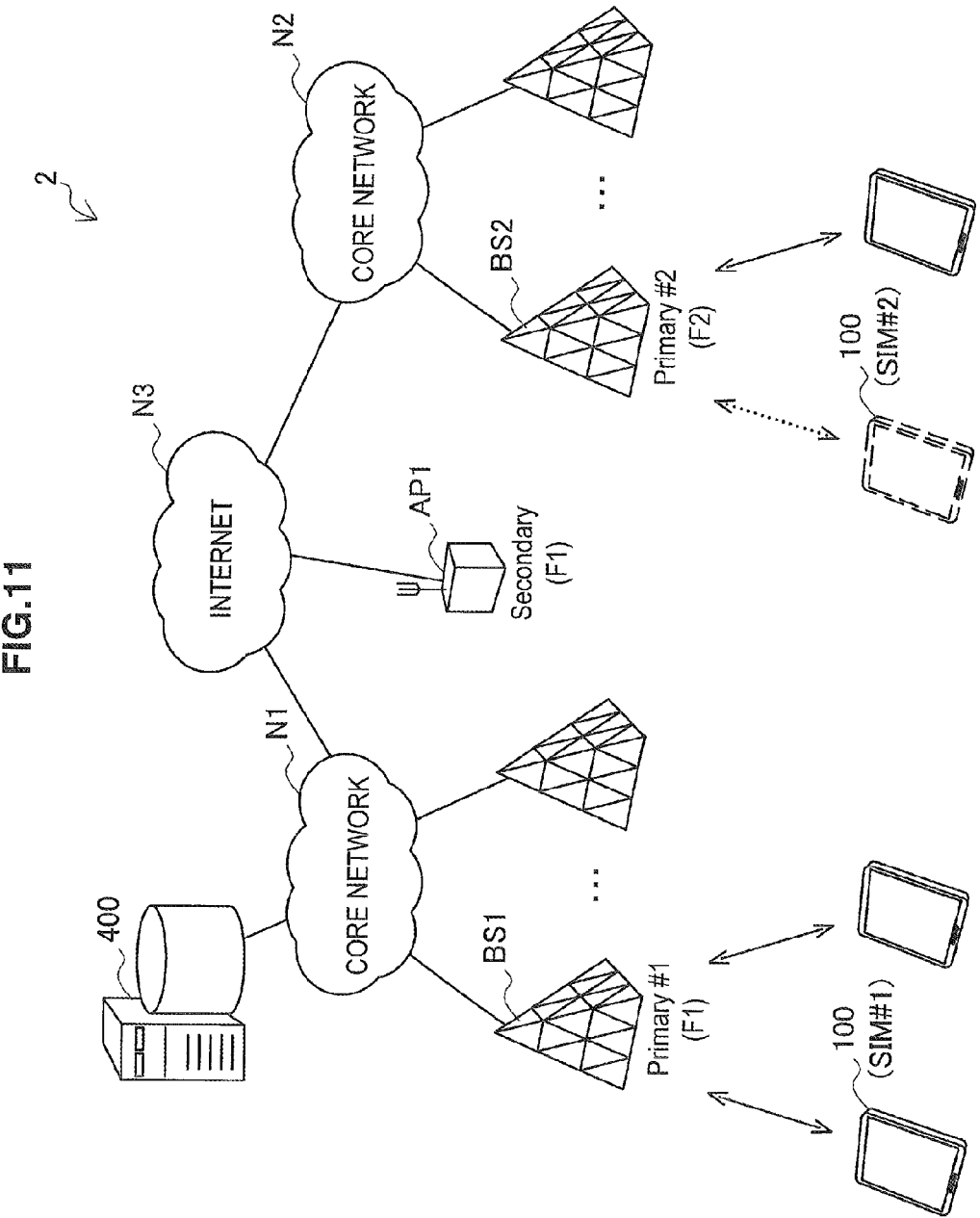
FIG. 11 is an explanatory diagram for explaining a modification.

Referring to FIG. 11, a schematic network configuration of a communication system 2 is illustrated. In the communication system 2, a base station BS1 provides a first primary communication service to one or more terminal devices on a frequency channel F1. The base station BS1 is connected to a core network N1. A base station BS2 provides a second primary communication service to one or more terminal devices on a frequency channel F2. The base station BS2 is connected to a core network N2. The core networks N1 and N2 may be connected to each other, for example, via the Internet N3. A wireless access point AP1 provides a secondary communication service by secondarily using the frequency channel F1.

A communication control device 400 is a control node connected to the core network N1. The communication control device 400 combines the functions of both the communication control devices 200 and 300 described above. In other words, the communication control device 400 controls provision of the first primary communication service by the base station BS1, and also controls provision of the secondary communication service by the wireless access point AP1. For example, communication control device 400 instructs the terminal device 100 to switch SIM information depending on the communication quality of the terminal device 100 that is connected to the first primary communication service using first SIM information. Then, the terminal device 100 switches the SIM information and then is newly connected to the second primary communication service. The communication control device 400 then increases the transmission power of the secondary communication service provided by the wireless access point AP1. As a result, an opportunity to use the secondary communication service provided by the wireless access point AP1 may be expanded.

In accordance with the configuration according to the present modification, it is possible to control the transmission power of the secondary communication service in a more responsive and delicate manner depending on the conditions of the primary communication service. For example, signaling between the communication control device 200a and the communication control device 300 illustrated in FIG. 8 becomes unnecessary, and the communication control device 400 can determine the transmission power of the secondary communication service by using various parameters that are reported from the terminal device 100.

7. Summary

An embodiment and its modification of the technology according to the present disclosure have been described in detail hereinabove with reference to FIGS. 1 to 11. According to the present embodiment, in a case where the SIM information corresponding to a frequency channel that is secondarily used by the secondary communication service is switched to other SIM information in a terminal device capable of communication by using any of a plurality of SIM information, the transmission power of the secondary communication service is increased. Thus, the bit rate of the secondary telecommunication service is higher, or its service area is expanded. Accordingly, it is possible to create actively an opportunity to use the secondary communication service and utilize limited resources more efficiently, without giving excessive interference to the primary receiving station.

The control of the transmission power of the secondary communication services described above may be performed, for example, depending on the instruction for the terminal device to switch the SIM information from a node that instructs the terminal device to switch the SIM information. According to such a configuration, it is possible to determine independently whether switching of SIM information is necessary in a wireless communication network side, and thus to expand an opportunity to use the secondary communication service depending on the determination result.

Furthermore, the switching of SIM information is performed spontaneously in the terminal device, and it may be reported to a node that controls the transmission power of the secondary communication service. According to such a configuration, it is possible to expand an opportunity to use the secondary communication service without increasing the processing load of a node that provides the primary communication service.

Moreover, according to the present embodiment, there is provided a mechanism for signaling from a node that provides the primary communication service to a node that controls the transmission power of the secondary communication service. Therefore, even when the secondary communication service and the primary communication service are provided by different carriers, it is possible to implement the control of the transmission power of the secondary communication service depending on the conditions of the primary communication service.

On the other hand, in the case where the secondary communication service and the primary communication service are provided by the same carrier, it becomes possible to control the transmission power of the secondary communication services in a more responsive and delicate manner depending on the conditions of the primary communication service, by forming integrally a node that provides the primary communication service and a node that controls the transmission power of the secondary communication service.

Furthermore, according to the present embodiment, in a case where the communication quality measured for the primary communication service to which the terminal device is being connected is lower than a given threshold, a communication quality for other primary communication services can be measured. If the communication quality for the other primary communication service is higher, then the switching of SIM information can be performed. According to such a configuration, it is possible to avoid that the communication quality accepted by a multi-SIM terminal is impaired by the switching of SIM information. In addition, the number of times of the determination of whether the switching of SIM information is necessary or not is reduced, and thus it is possible to reduce processing overhead.

The above-described embodiments can be applied to the cases where a multi-SIM terminal equipped with a plurality of SIM cards is already widely used. In addition, the above-described embodiments can also be applied to the cases where a terminal capable of storing a plurality of SIM information or rewriting SIM information is used.

A series of control processes to be performed by each device described herein may be implemented using either software or hardware, or a combination of software and hardware. Programs constituting software may be previously stored, for example, in a storage medium provided inside or outside each device. Each of the programs is then loaded into the RAM at run time and executed by a processor.

Although an example where a terminal device has two pieces of SIM information has been mainly described herein, the above-described embodiments may be equally applicable to a case where a terminal device has three or more pieces of SIM information. Furthermore, although an example where there are two primary communication services has been mainly described herein, the above-described embodiments may be equally applicable to a case where there are three or more primary communication services.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

Additionally, the present technology may also be configured as below.

(1)

A communication control device including:

a power control unit configured to control a transmission power of a secondary communication service to be provided at least near an area where a first primary communication service is provided, wherein the power control unit increases the transmission power of the secondary communication service upon performing a switching from subscriber identity module (SIM) information corresponding to the first primary communication service to SIM information corresponding to a second primary communication service in a terminal device using a communication service by using any SIM information switched between a plurality of SIM information.

(2)

The communication control device according to (1), wherein the power control unit controls the transmission power of the secondary communication service in accordance with an instruction for causing the terminal device to switch SIM information from a node configured to instruct the terminal device to switch SIM information.

(3)

The communication control device according to (2), wherein the secondary communication service is a communication service provided by a same carrier as a carrier who provides the first primary communication service or the second primary communication service, and wherein the node is the communication control device.

(4)

The communication control device according to (2), wherein the node is a different device from the communication control device, and wherein the communication control device further includes a communication unit configured to receive, from the node, a notification of the instruction for causing the terminal device to switch SIM information.

(5)

The communication control device according to (1), wherein the power control unit controls the transmission power of the secondary communication service in accordance with a report of the switching of SIM information from the terminal device.

(6)

The communication control device according to any one of (1) to (5), wherein the first primary communication service is assigned a different frequency channel from a frequency channel assigned to the second primary communication service, and wherein the secondary communication service is provided on at least some channels of frequency channels assigned to the first primary communication service.

(7)

The communication control device according to any one of (1) to (6), wherein the power control unit controls the transmission power of the secondary communication service so that an interference level to the first primary communication service which caused by a wireless signal of the secondary communication service does not exceed a predetermined allowable interference level.

(8)

The communication control device according to (7), wherein the power control unit obtains the predetermined allowable interference level depending on the switching of SIM information in the terminal device.

(9)

The communication control device according to (7) or (8), wherein when it is determined that a provision of the secondary communication service is interrupted as a result of control of the transmission power of the secondary communication service, the power control unit recommends a handover to another communication service to the terminal device using the secondary communication service.

(10)

The communication control device according to any one of (1) to (9), wherein the terminal device is equipped with a plurality of SIM cards and is a terminal capable of performing communication by using SIM information of each of the plurality of SIM cards.

(11)

The communication control device according to any one of (1) to (9), wherein the terminal device has a memory for storing a plurality of SIM information and is a terminal capable of performing communication by using each of the plurality of SIM information.

(12)

The communication control device according to any one of (1) to (9), wherein the terminal device has a memory for storing SIM information capable of being rewritten between a plurality of SIM information and is a terminal capable of performing communication by using SIM information stored in the memory.

(13)

A communication control method performed by a communication control device configured to control a secondary communication service to be provided at least near an area where a first primary communication service is provided, the method including:

increasing a transmission power of the secondary communication service upon performing a switching from subscriber identity module (SIM) information corresponding to the first primary communication service to SIM information corresponding to a second primary communication service in a terminal device using a communication service by using any SIM information switched between a plurality of SIM information.

(14)

A communication system including:

a terminal device configured to use a communication service by using any subscriber identity module (SIM) information switched between a plurality of SIM information corresponding to a plurality of primary communication services; and a communication control device configured to include a power control unit for controlling a transmission power of a secondary communication service to be provided at least near an area where a first primary communication service is provided, wherein the power control unit increases the transmission power of the secondary communication service upon performing a switching from SIM information corresponding to the first primary communication service to SIM information corresponding to a second primary communication service in the terminal device.

(15)

A terminal device including:

a communication unit configured to communicate by using any subscriber identity module (SIM) information switched between a plurality of SIM information corresponding to a plurality of primary communication services; and a control unit configured to, when SIM information used by the communication unit is switched from first SIM information corresponding to a first primary communication service to second SIM information corresponding to a second primary communication service, report the switching to a communication control device for controlling a transmission power of a secondary communication service to be provided at least near an area where the first primary communication service is provided.

(16)

The terminal device according to (15), further including:

a measurement unit configured to measure a quality of communication by the communication unit; and a switching unit configured to switch SIM information used by the communication unit, wherein the switching unit switches SIM information from the first SIM information to the second SIM information when a communication quality of the second primary communication service is higher than a communication quality measured by the measurement unit for the first primary communication service.

(17)

The terminal device according to (16), wherein the measurement unit measures a communication quality of the second primary communication service when the communication quality measured for the first primary communication service is lower than a given threshold.

(18)

The terminal device according to (17), wherein the given threshold is different for each cell type of the first primary communication service.

(19)

The terminal device according to any one of (15) to (18), wherein the switching of SIM information used by the communication unit is reported to the communication control device via a base station of the first primary communication service or a base station of the second primary communication service.

(20)

A communication control device for providing a first primary communication service to a terminal device that communicates by using any subscriber identity module (SIM) information switched between a plurality of SIM information corresponding to a plurality of primary communication services, including:

an instruction unit configured to instruct the terminal device to switch from SIM information corresponding to the first primary communication service to SIM information corresponding to a second primary communication service depending on a communication quality of the first primary communication service for the terminal device; and a secondary control unit configured to cause a node to increase a transmission power of a secondary communication service in accordance with the instruction by the instruction unit, the node being configured to control the transmission power of the secondary communication service provided at least near an area where the first primary communication service is provided.

REFERENCE SIGNS LIST 1 communication system
100 terminal device
110 communication unit
120 measurement unit
130 controller
140 switching unit
200 communication control device (primary side)
250 instruction unit 260 secondary control unit
300 communication control device (secondary side)
320 network communication unit
340 power control unit
400 communication control device (primary side/secondary side)

The invention claimed is:

1. A communication control device comprising:
a central processing unit (CPU) configured to control a transmission power of a secondary communication service to provide at an area where at least a part of coverage of the secondary communication service is overlapped with a coverage of a first primary communication service; and
communication interface configured to:
transmit instructions to a terminal device to switch subscriber identity module (SIM) information corresponding to the first primary communication service to SIM information corresponding to a second primary communication service, or
receive information pertaining to the terminal device switching between the SIM information,
wherein the CPU increases the transmission power of the secondary communication service upon performing the switching from the subscriber identity module (SIM) information corresponding to the first primary communication service to the SIM information corresponding to the second primary communication service in the terminal device using a communication service by using any SIM information switched between a plurality of SIM information.

2. The communication control device according to claim 1, wherein the CPU controls the transmission power of the secondary communication service in accordance with an instruction for causing the terminal device to switch SIM information from a node configured to instruct the terminal device to switch SIM information.

3. The communication control device according to claim 2, wherein the secondary communication service is a communication service provided by a same carrier as a carrier who provides the first primary communication service or the second primary communication service, and
wherein the node is the communication control device.

4. The communication control device according to claim 2, wherein the node is a different device from the communication control device, and wherein the information pertaining to the terminal device switching between the SIM information is a notification of the instruction for causing the terminal device to switch SIM information.

5. The communication control device according to claim 1, wherein the CPU controls the transmission power of the secondary communication service in accordance with a report of the switching of SIM information from the terminal device.

6. The communication control device according to claim 1, wherein the first primary communication service is assigned a different frequency channel from a frequency channel assigned to the second primary communication service, and
wherein the secondary communication service is provided on at least some channels of frequency channels assigned to the first primary communication service.

7. The communication control device according to claim 1, wherein the CPU controls the transmission power of the secondary communication service so that an interference level to the first primary communication service which caused by a wireless signal of the secondary communication service does not exceed a predetermined allowable interference level.

8. The communication control device according to claim 7, wherein the CPU obtains the predetermined allowable interference level depending on the switching of SIM information in the terminal device.

9. The communication control device according to claim 7, wherein when it is determined that a provision of the secondary communication service is interrupted as a result of control of the transmission power of the secondary communication service, the CPU recommends a handover to another communication service to the terminal device using the secondary communication service.

10. The communication control device according to claim 1, wherein the terminal device is equipped with a plurality of SIM cards and is a terminal capable of performing communication by using SIM information of each of the plurality of SIM cards.

11. The communication control device according to claim 1, wherein the terminal device has a memory for storing the plurality of SIM information and is a terminal capable of performing communication by using each of the plurality of SIM information.

12. The communication control device according to claim 1, wherein the terminal device has a memory for storing SIM information capable of being rewritten between the plurality of SIM information and is a terminal capable of performing communication by using SIM information stored in the memory.

13. A communication control method performed by a communication control device configured to control a secondary communication service to be provided at an area where at least a part of coverage of the secondary communication service is overlapped with a coverage of a first primary communication service, the method comprising:
at least one of:
transmitting instructions to a terminal device to switch subscriber identity module (SIM) information corresponding to the first primary communication service to SIM information corresponding to a second primary communication service, or
receiving information pertaining to the terminal device switching between the SIM information, and
increasing a transmission power of the secondary communication service upon performing the switching from the subscriber identity module (SIM) information corresponding to the first primary communication service to the SIM information corresponding to the second primary communication service in the terminal device using a communication service by using any SIM information switched between a plurality of SIM information.

14. A communication system comprising:
a terminal device configured to use a communication service by using any subscriber identity module (SIM) information switched between a plurality of SIM information corresponding to a plurality of primary communication services; and
a communication control device configured to include:
a CPU for controlling a transmission power of a secondary communication service to be provided at an area where at least a part of coverage of the secondary communication service is overlapped with a coverage of a first primary communication service; and
communication interface configured to:
 transmit instructions to a terminal device to switch subscriber identity module (SIM) information corresponding to the first primary communication service to SIM information corresponding to a second primary communication service, or
 receive information pertaining to the terminal device switching between the SIM information,
 wherein the CPU increases the transmission power of the secondary communication service upon performing the switching from the SIM information corresponding to the first primary communication service to the SIM information corresponding to the second primary communication service in the terminal device.

15. A terminal device comprising:
a communication interface configured to communicate by using any subscriber identity module (SIM) information switched between a plurality of SIM information corresponding to a plurality of primary communication services; and
a CPU configured to, when SIM information used by the communication interface is switched from first SIM information corresponding to a first primary communication service to second SIM information corresponding to a second primary communication service, report the switching to a communication control device for controlling a transmission power of a secondary communication service to be provided at an area where at least a part of coverage of the secondary communication service is overlapped with a coverage of the first primary communication service.

16. The terminal device according to claim 15,
wherein the CPU of the terminal device is further configured to measure a quality of communication by the communication interface, and wherein the terminal device further comprises:
a switch configured to switch SIM information used by the communication interface, wherein the switch switches SIM information from the first SIM information to the second SIM information when a communication quality of the second primary communication service is higher than a communication quality measured by the CPU for the first primary communication service.

17. The terminal device according to claim 16, wherein the CPU measures a communication quality of the second primary communication service when the communication quality measured for the first primary communication service is lower than a given threshold.

18. The terminal device according to claim 17, wherein the given threshold is different for each cell type of the first primary communication service.

19. The terminal device according to claim 15, wherein the switching of SIM information used by the communication interface is reported to the communication control device via a base station of the first primary communication service or a base station of the second primary communication service.

20. A communication control device for providing a first primary communication service to a terminal device that communicates by using any subscriber identity module (SIM) information switched between a plurality of SIM information corresponding to a plurality of primary communication services, comprising:
a central processing unit (CPU) configured to control a communication interface of the communication control device to transmit instructions to the terminal device to switch from SIM information corresponding to the first primary communication service to SIM information corresponding to a second primary communication service depending on a communication quality of the first primary communication service for the terminal device, wherein the CPU is further configured to control the communication interface to transmit instructions to cause a node to increase a transmission power of a secondary communication service in accordance with the instruction by the CPU of the communication control device, the node being configured to control the transmission power of the secondary communication service provided at an area where at least a part of coverage of the secondary communication service is overlapped with a coverage of the first primary communication service is provided.

* * * * *